(12) United States Patent
Hildebrand (10) Patent No.: US 6,951,343 B2
(45) Date of Patent: Oct. 4, 2005

(54) VEHICLE SUSPENSION APPARATUS (75) Inventor: Curt Hildebrand, Casper, WY (US)

(73) Assignee: BDS Co. Inc., Coldwater, MI (US)

( * ) Notice: Subject to any disclaimer, the term of this patent is extended or adjusted under 35 U.S.C. 154(b) by 129 days.

(21) Appl. No.: 10/382,373

(22) Filed: Mar. 6, 2003

(65) Prior Publication Data
US 2004/0173984 A1 Sep. 9, 2004

(51) Int. Cl.[7] .......................... B60G 15/06; B60G 11/46
(52) U.S. Cl. ............................. 280/124.175; 280/788; 280/124.17; 267/263
(58) Field of Search .................... 280/788, 124.17, 280/124.175, FOR 175; 267/263

(56) References Cited

U.S. PATENT DOCUMENTS

| | | | | |
|---|---|---|---|---|
| 2,031,482 A | * | 2/1936 | Hickamn | 280/124.165 |
| 3,743,109 A | * | 7/1973 | Hutchison | 213/43 |
| 3,856,319 A | * | 12/1974 | Hardy | 280/63 |
| 3,866,894 A | * | 2/1975 | Sweet et al. | 267/31 |
| 3,920,264 A | * | 11/1975 | Lafferty | 280/124.165 |
| 3,930,547 A | * | 1/1976 | West | 280/25 |
| 4,098,523 A | * | 7/1978 | Valerio | 280/124.104 |
| 4,194,760 A | * | 3/1980 | Shiomi et al. | 280/86.753 |
| 4,225,152 A | * | 9/1980 | Eaton | 280/124.163 |
| 4,934,493 A | * | 6/1990 | Bauer et al. | 188/381 |
| 5,129,671 A | * | 7/1992 | Walton | 280/5.51 |
| 5,470,096 A | * | 11/1995 | Baxter | 280/124.116 |
| 6,015,158 A | * | 1/2000 | Overby | 280/11.225 |
| 6,039,311 A | * | 3/2000 | Farnsworth | 267/227 |

FOREIGN PATENT DOCUMENTS

| | | | |
|---|---|---|---|
| DE | 85099 | * | 8/1921 |
| DE | 900059 | * | 8/1949 |
| GB | 2 271 747 | * | 4/1994 |
| JP | 10-157430 | * | 6/1998 |
| JP | 2004-182182 | * | 7/2004 |

* cited by examiner

Primary Examiner—Paul N. Dickson
Assistant Examiner—George D. Spisich
(74) Attorney, Agent, or Firm—Flynn, Thiel, Boutell & Tanis, P.C.

(57) ABSTRACT

A vehicle suspension apparatus includes a first, outer telescoping component and a second, inner telescoping component. The outer telescoping component includes an outer sleeve and an outer tubular member telescoped therein for movement along an axis of the outer telescoping component. The inner telescoping component includes an inner sleeve and an inner telescoping member telescoped therein for movement along an axis of the inner telescoping component. The inner telescoping component axis is aligned with the outer telescoping component axis. The inner sleeve is fixedly attached to one of the outer sleeve and the outer tubular member. The inner telescoping member is fixedly attached to the other of the outer sleeve and the outer tubular member. A bracket is configured to fixedly attach the suspension device to a vehicle support member. The outer tubular member includes an attachment member which is configured to pivotally receive an end of a leaf spring.

16 Claims, 9 Drawing Sheets

VEHICLE SUSPENSION APPARATUS

FIELD OF THE INVENTION

This invention relates generally to a vehicle suspension device.

BACKGROUND OF THE INVENTION

A typical automotive vehicle has a suspended portion, or body, such as a unit body or a frame supporting body work, which carries suspension attachment points. A suspension system supported on a ground engaging member (e.g. wheel) is attached to and supports the vehicle suspended portion at these attachment points. The configuration of available vehicle suspension systems varies widely.

Figure 1A:
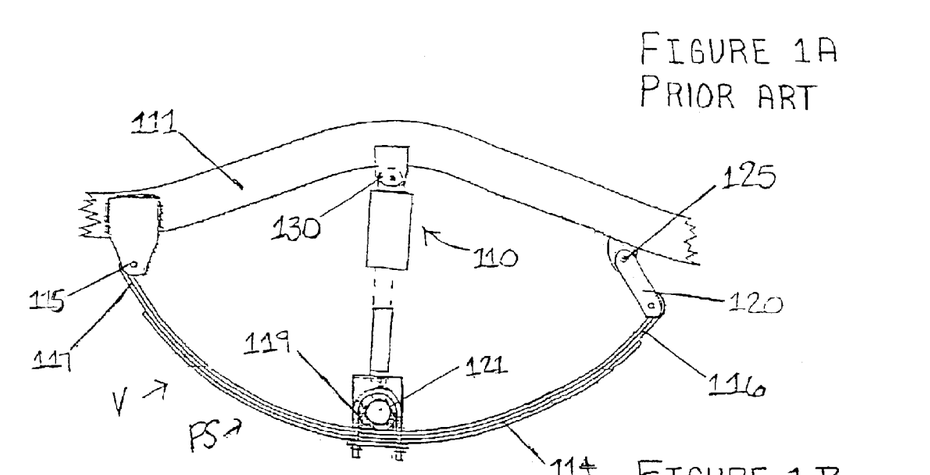
FIGS. 1A–1C illustrate a prior art suspension system in substantially fully unloaded, rest and substantially fully loaded conditions, respectively.
Figure 1B:
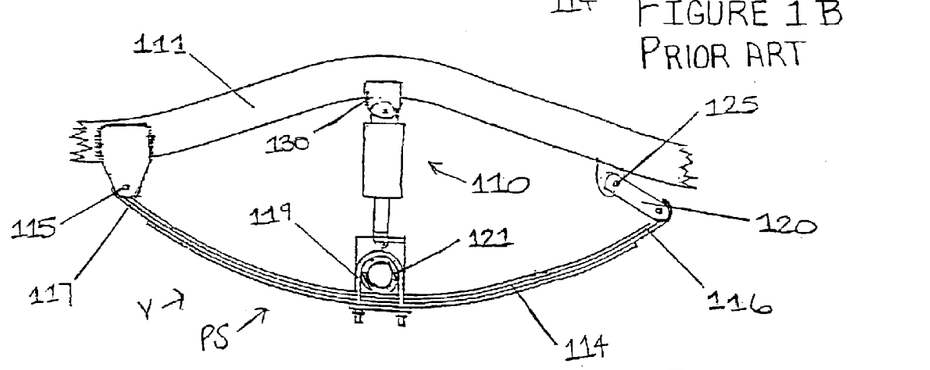
Figure 1C:
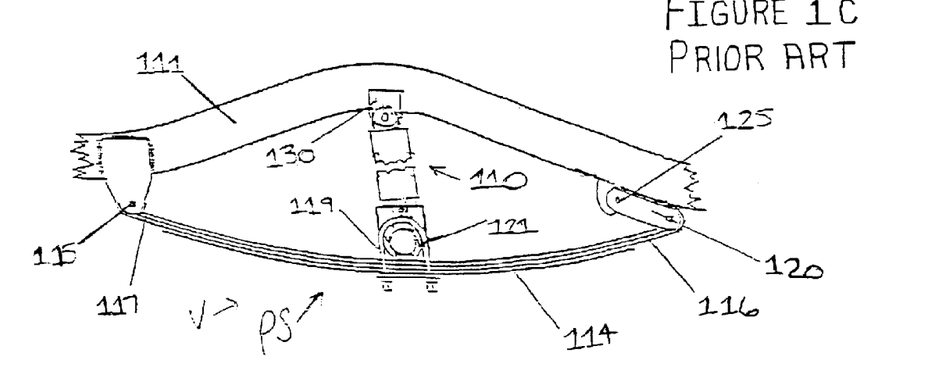

One type of suspension system long used on trucks and passenger cars and still used on various off-road recreational vehicles, such as Jeep brand vehicles like the Jeep Wrangler, is illustrated in FIGS. 1A–1C. There a vehicle V has a suspended portion 111 which faces downward toward a prior suspension system PS. The latter includes a leaf spring 114 having a first end 117 which is pivoted on a first suspension attachment point 115 on the vehicle's suspended portion 111. A second end 116 of the leaf spring 114 is pivotally attached to a shackle 120. The shackle 120 in turn is pivotally attached to the suspended portion 111 at a second suspension attachment point 125. The attachment points 115 and 125 are typically spaced longitudinally along the vehicle. In the example shown, the vehicle suspended portion 111 is a body work supporting frame, and the suspension points 115 and 125 are pivot defining brackets pendant from and fixed to such frame. A mid-portion of the leaf spring 114 is fixed to a wheel supported axle 121, such as by a bracket 119, e.g. including U-bolts and a clamp plate as shown.

During vehicle travel on uneven ground, the leaf spring 114 flexes to allow the wheel to rise toward the vehicle body while rolling over a bump and to fall away from the vehicle body while rolling through a dip, i.e. the suspension system is respectively loaded and unloaded, such that the leaf spring respectively straightens and bows. The suspended portion 111 of the vehicle experiences a relatively level (i.e. relatively rise-free and fall-free) ride as the wheel rises and falls. To damp continued oscillatory flexing of the spring 114 after the wheel encounters a bump or a dip, and hence reduce continued oscillatory bouncing of the suspended portion 111 of the vehicle, it is conventional to interpose a damper between the axle 121 and the suspended portion 111 of the vehicle. Typically, the damper is a telescoping hydraulic shock absorber 110 which is fixed substantially vertically between the axle 121 and a third suspension attachment point 130 on the vehicle suspended portion 111. This third suspension attachment point 130 is located between the first and second attachment points 115 and 125 of the vehicle.

While traditional suspension systems, such as that illustrated in FIGS. 1A–1C, may perform adequately on the road or relatively smooth off-road terrain, applicant has found inadequacies in rougher off-road terrain.

For instance, as illustrated in FIGS. 1A–1C, a typical shock absorber 110 may have insufficient extension/retraction travel to allow the leaf spring 114 to fully flex and hence provide the maximum possible vertical wheel travel as the wheel rolls through severe bumps and dips.

Thus, the shock absorber 110 would have to be destroyed i.e. pulled apart or squashed as schematically shown in FIGS. 1A and 1C, respectively, to achieve the full bowing and straightening, respectively, of which the leaf spring is capable.

To increase wheel travel, the shock absorber 110 is sometimes removed. The spring can thus further bow and further straighten. However, upon sufficient additional straightening of the leaf spring, as illustrated in FIG. 1C, the shackle 120 may strike the vehicle suspended portion 111 and suddenly block further wheel/axle travel. The shock of one or more such events may break or otherwise damage the suspended portion 111 and/or parts of the suspension system.

SUMMARY OF THE INVENTION

This invention is directed to a new and useful vehicle suspension apparatus for use on a vehicle having a suspended portion. An elongate resiliently bendable member is connected to the suspended portion. A telescoping suspension device is attached to an end portion of the bendable member. The suspension device has a first member which is non-pivotally mounted on the support component and a second member which is telescoped with respect to the first member.

DETAILED DESCRIPTION

Figure 2A:
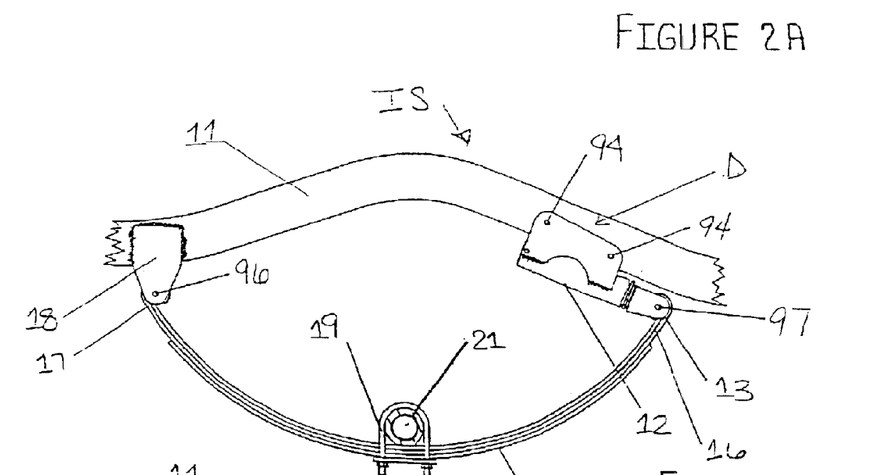
FIGS. 2A–2C illustrate a vehicle suspension system embodying the present invention in substantially fully unloaded, rest and substantially fully loaded conditions, respectively.
Figure 2B:
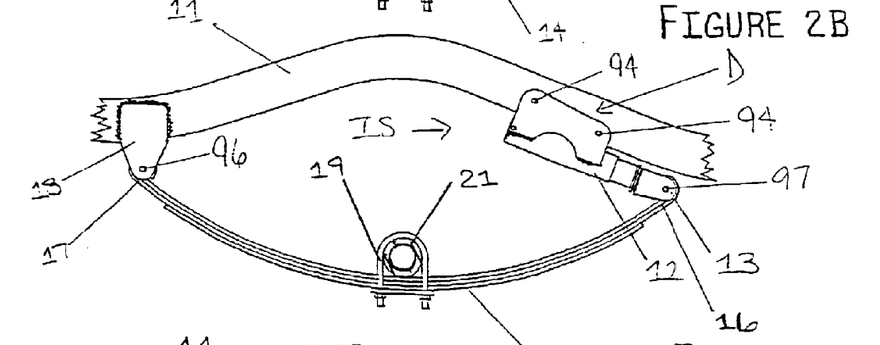
Figure 2C:
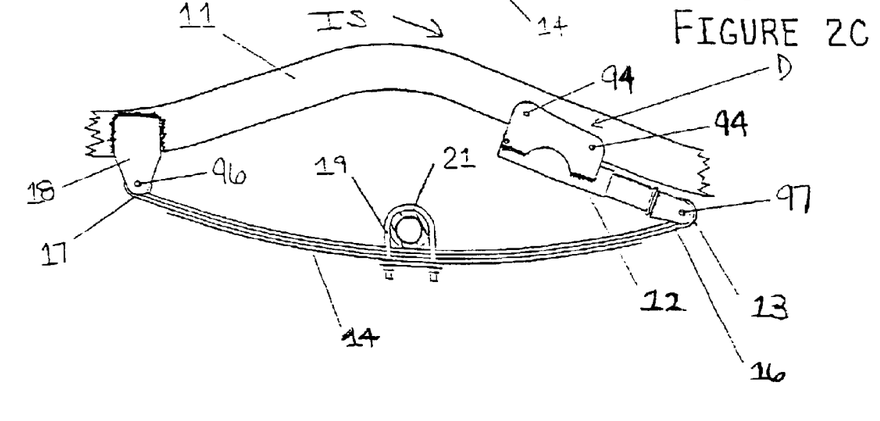

FIGS. 2A–2C illustrate a portion of a vehicle V with a suspension mounting having an improved vehicle suspension system IS embodying the present invention. For convenience in illustration, the improved suspension system IS is shown to include some structural elements similar to corresponding structural elements in Prior Art FIGS. 1A–1C discussed above. Structural elements in FIGS. 2A–C, similar to corresponding structural elements in FIGS. 1A–C, carry the same reference numerals, with 100 subtracted therefrom.

Thus, in FIGS. 2A–C, the shackle 120 and attachment point 125 are eliminated, leaving a leaf spring 14 with a free end 16. Instead, an inventive suspension device D, hereafter described, has a first end portion, a vehicle body mountable unit, 12 fixed with respect to a vehicle support component 11 and a second end portion, a spring carrier, 13 coupled to the free end 16 of the leaf spring 14.

While a leaf spring is shown for purposes of illustration, it will be understood that other suitable resilient axle-to-mounting component structures may be substituted.

Figure 3A:
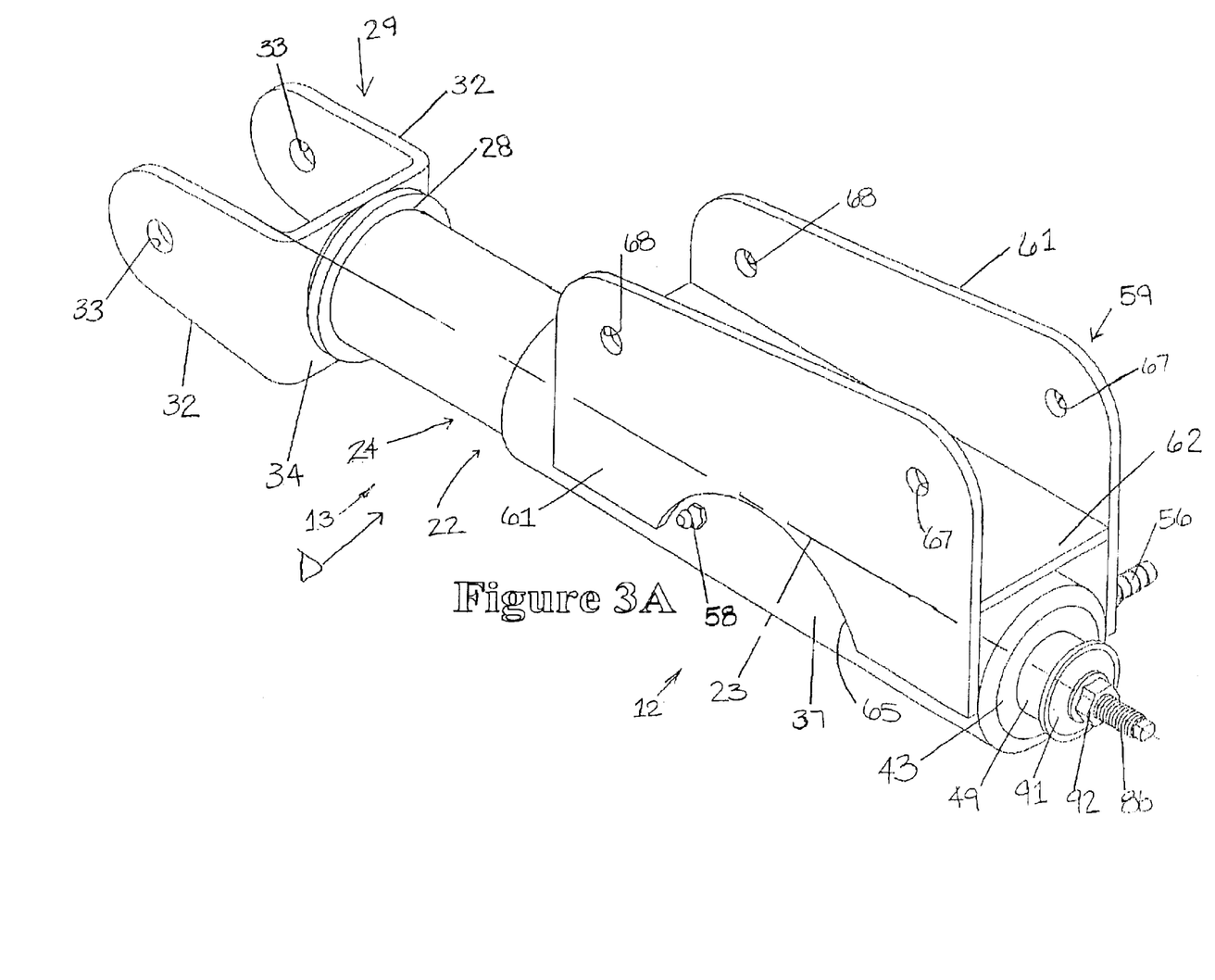
FIGS. 3A and 3B are pictorial views of a vehicle suspension system illustrated in FIGS. 2A–2C.
Figure 3B:
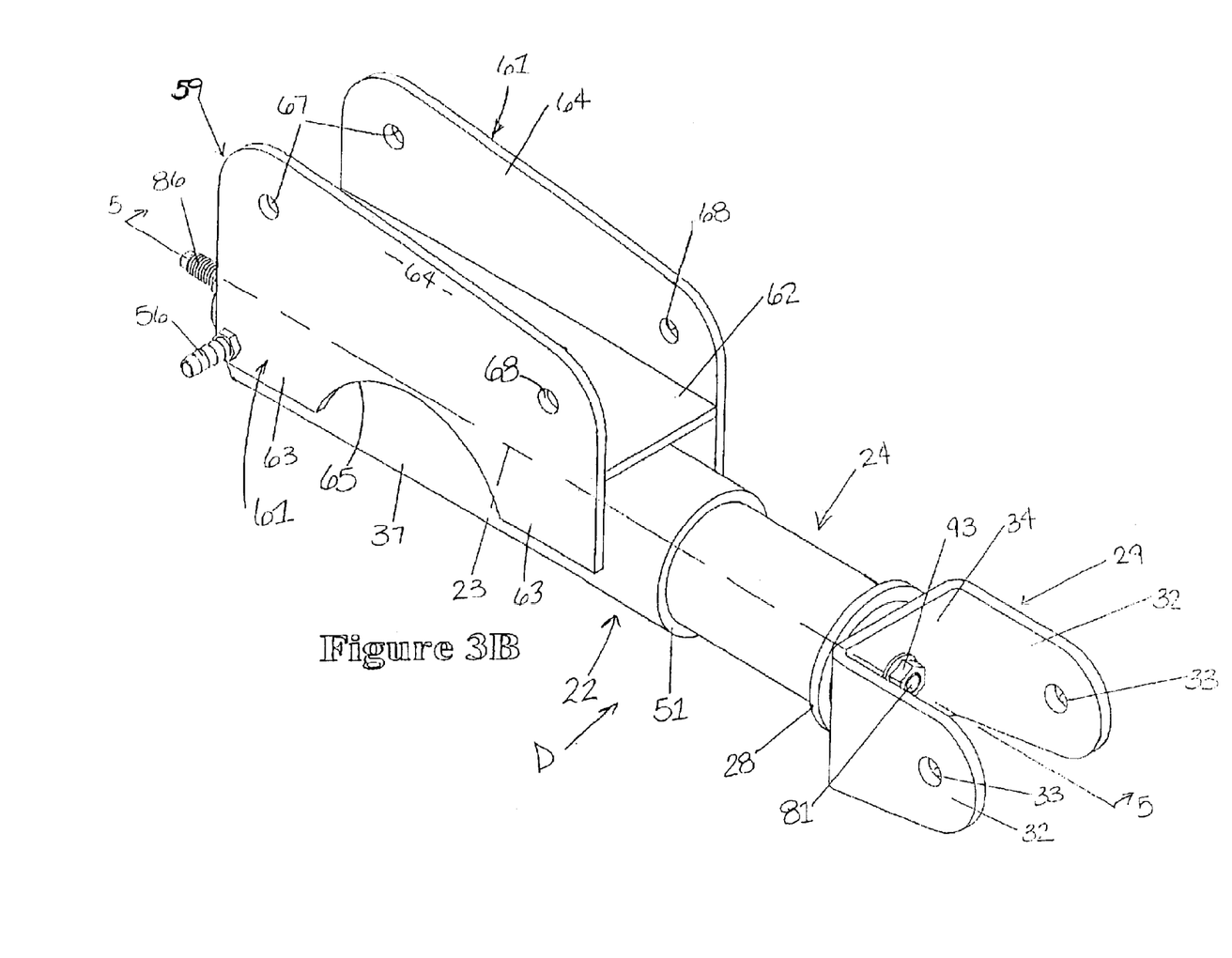

Referring to FIGS. 3A and 3B, the suspension device D includes telescoping outer housing 22 having a central longitudinal axis 23.

Figure 4:
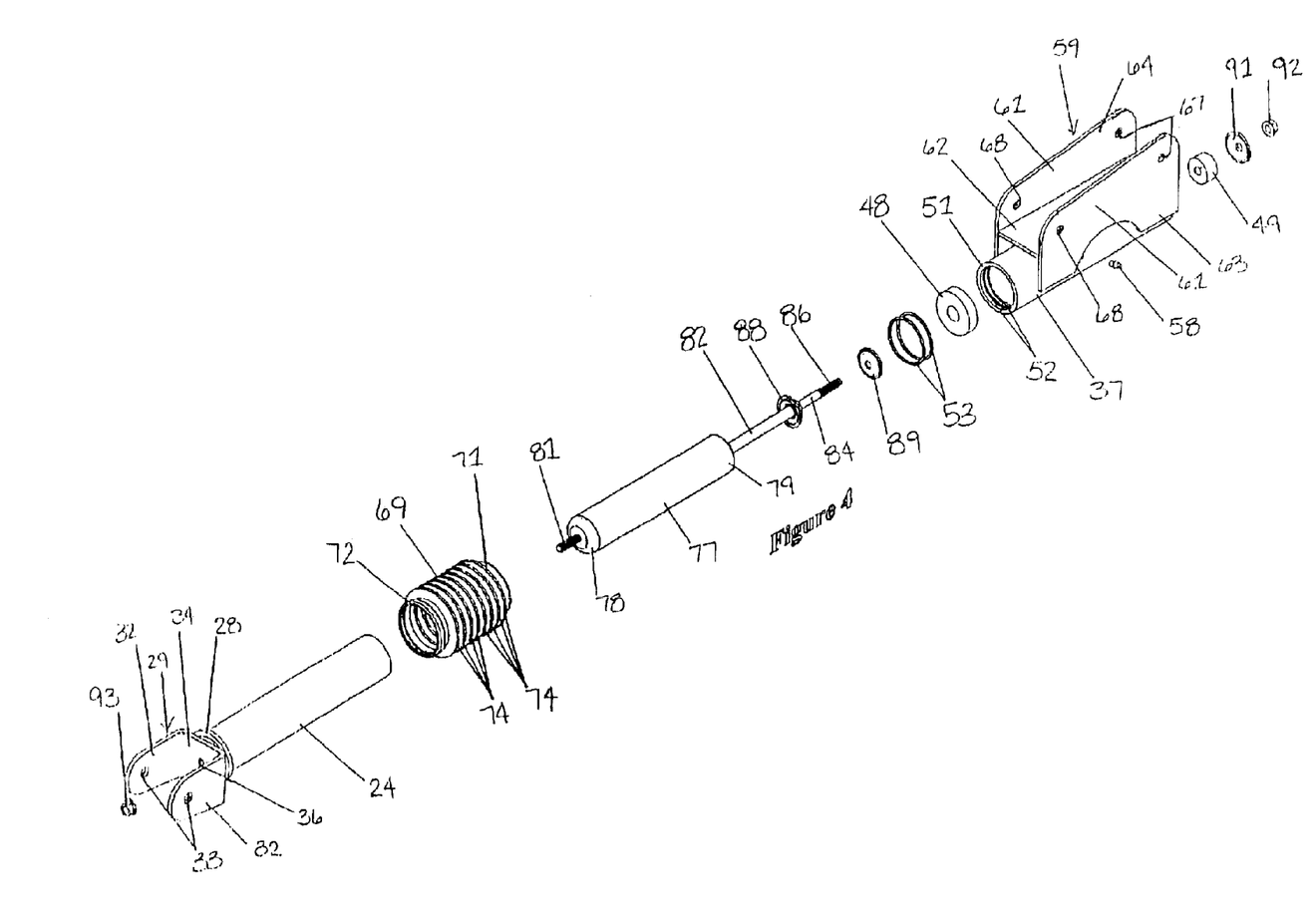
FIG. 4 is an exploded view of the FIG. 3A vehicle suspension system.
Figure 5:
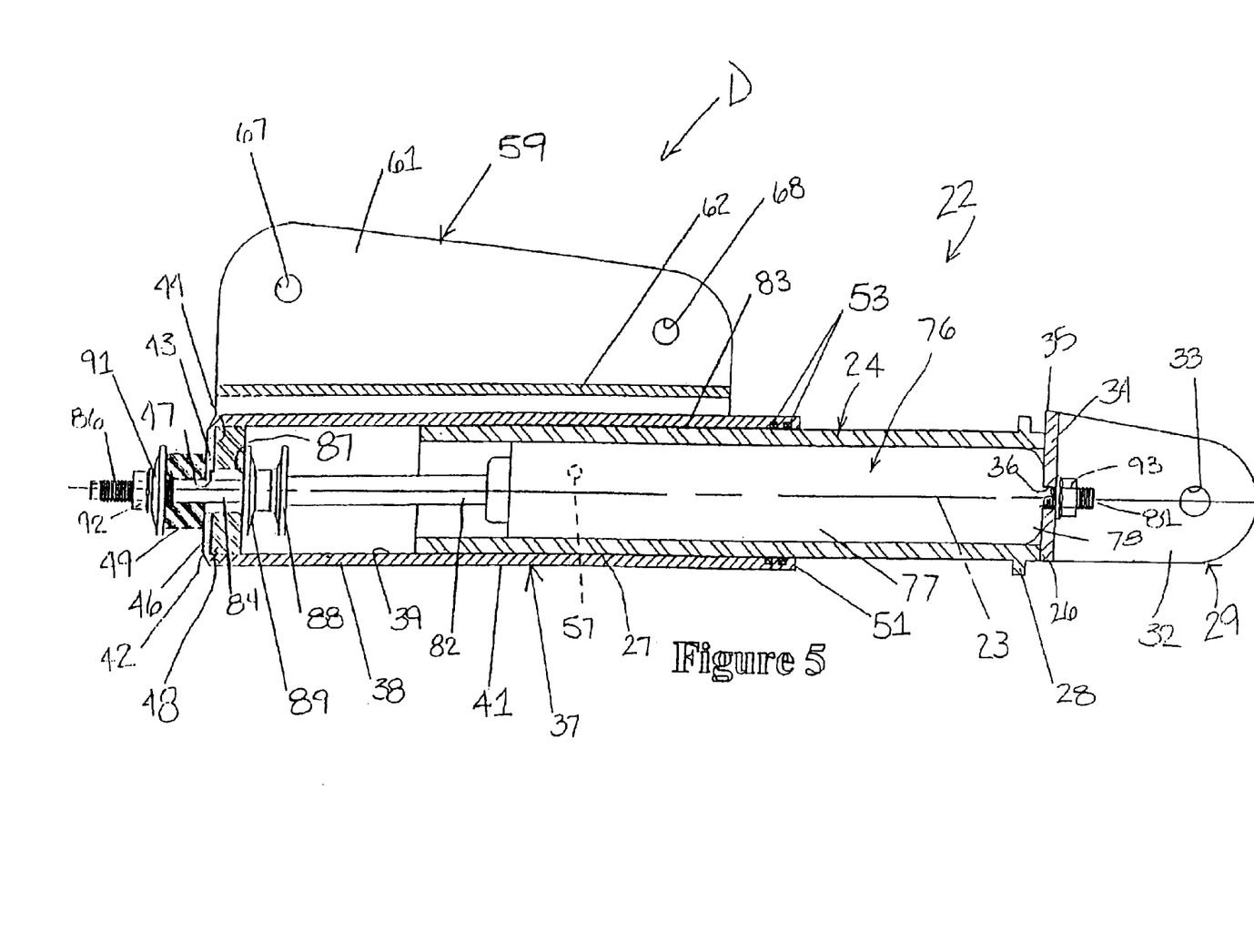
FIG. 5 is a central cross sectional view of the FIG. 3A vehicle suspension system taken along the line 5—5 of FIG. 3B.

The vehicle body mountable unit 12 comprises an elongate, generally cup shaped, cylindrical outer sleeve 37 (FIGS. 3A, 4 and 5). The sleeve 37 has a cylindrical interior chamber bounded by a hollow tubular wall 38. The peripheral wall 38 has an inner surface 39 and an outer surface 41. The sleeve 37 has an outboard end 42 closed by an end wall 43. The end wall 43 has an inner surface 44 and an outer surface 46. A coaxial bore 47 extends through the end wall 43. A stop bushing 48 preferably of a resilient material, e.g. polyurethane, is snugly slidably disposed in the sleeve 37 against the end wall inner surface 44. The sleeve 37 has an open inboard end 51. Two adjacent annular recesses 52 (FIG. 6) are formed in the sleeve inner surface 39, adjacent the open end 51. Each recess 52 is sized to receive a resilient seal ring, e.g. an O-ring, 53.

Figure 6:
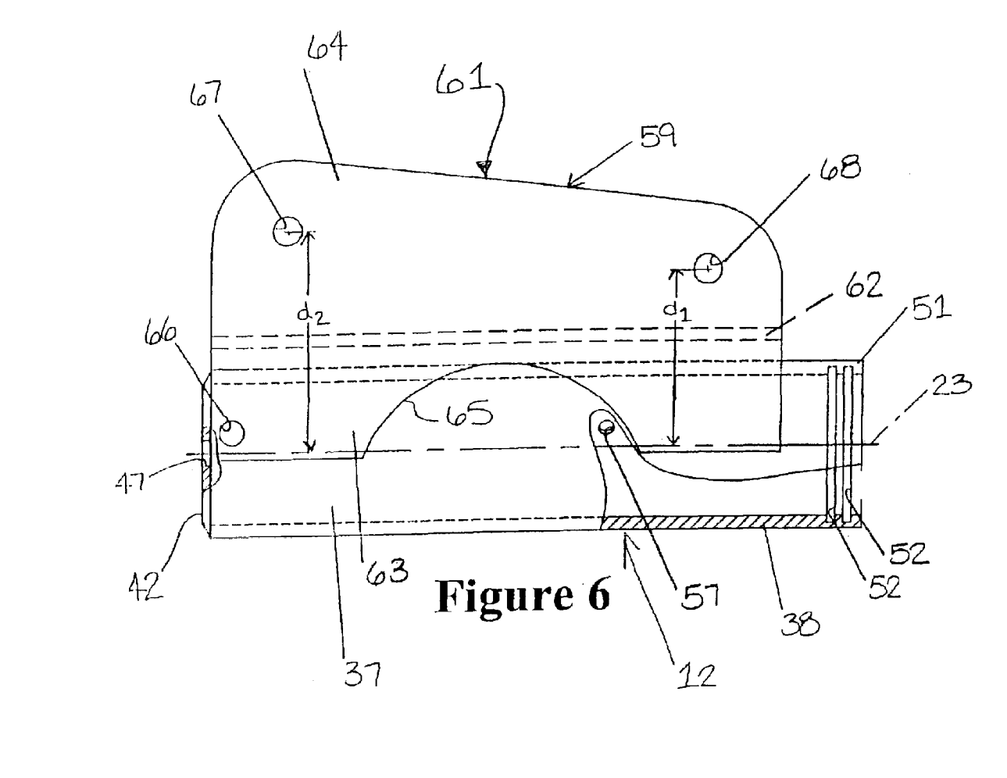
FIG. 6 is a partially broken side view of the outer telescoping member sleeve of FIG. 3B.
Figure 7:
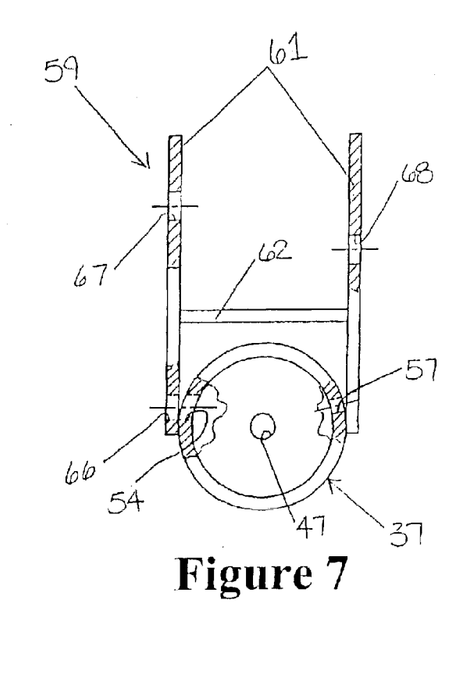
FIG. 7 is a partially broken end view looking toward the left in FIG. 6.

The vehicle body mountable unit 12 also includes a mounting bracket 59 (FIGS. 4, 5, 6 and 7). The bracket 59 is secured fixedly (as by welding) to the outer surface 41 of the sleeve 37. The bracket 59 preferably is generally H-shaped (FIG. 7) and comprises two spaced generally parallel side plates 61 having intermediate portions fixedly connected by a cross plate 62. The H-shaped bracket straddles the sleeve 37 in a saddle-like manner. The lower edge portion 63 of each side plate 61 is elongate, extends from near the sleeve inner end 51 almost to the sleeve outer edge 42, and is fixed along its length to the sleeve outer surface 41 as by welding to positively prevent the sleeve 37 from pivoting with respect to the bracket 59. The lower edge portion 63 of each side plate 61 has a central downward opening notch 65 (FIGS. 3A, 3B and 6). A bore 66 (FIGS. 6 and 7) through the lower edge portion 63 of one of the side plates 61 is adjacent the sleeve end wall 43 and is coaxial with a chordal bore 54 (FIG. 6) in the sleeve wall 38 near the closed end 42. The bores 54 and 66 fixedly and sealingly receive a breather vent 56 (FIG. 3B). The breather vent 56 vents the interior of the sleeve 37 to the atmosphere.

A bore 57 (FIG. 6) opens through the sleeve wall 38 intermediate its ends. A conventional grease input fitting 58 (FIG. 3A) is fixed in the bore 57.

Two pairs of axially aligned bores 67 and 68 (FIGS. 3A and 3B) extend through the upper edge portions 64 of the side plates 61. The bores 67 and 68 are adjacent respective ends of the side plates 61, respectively adjacent the sleeve outer and inner ends 42 and 51. The bores 68 are spaced a first distance $d_1$ (FIG. 6) above the longitudinal axis 23 and the bores 67 are spaced a greater second distance $d_2$ above the longitudinal axis 23.

Figure 8:
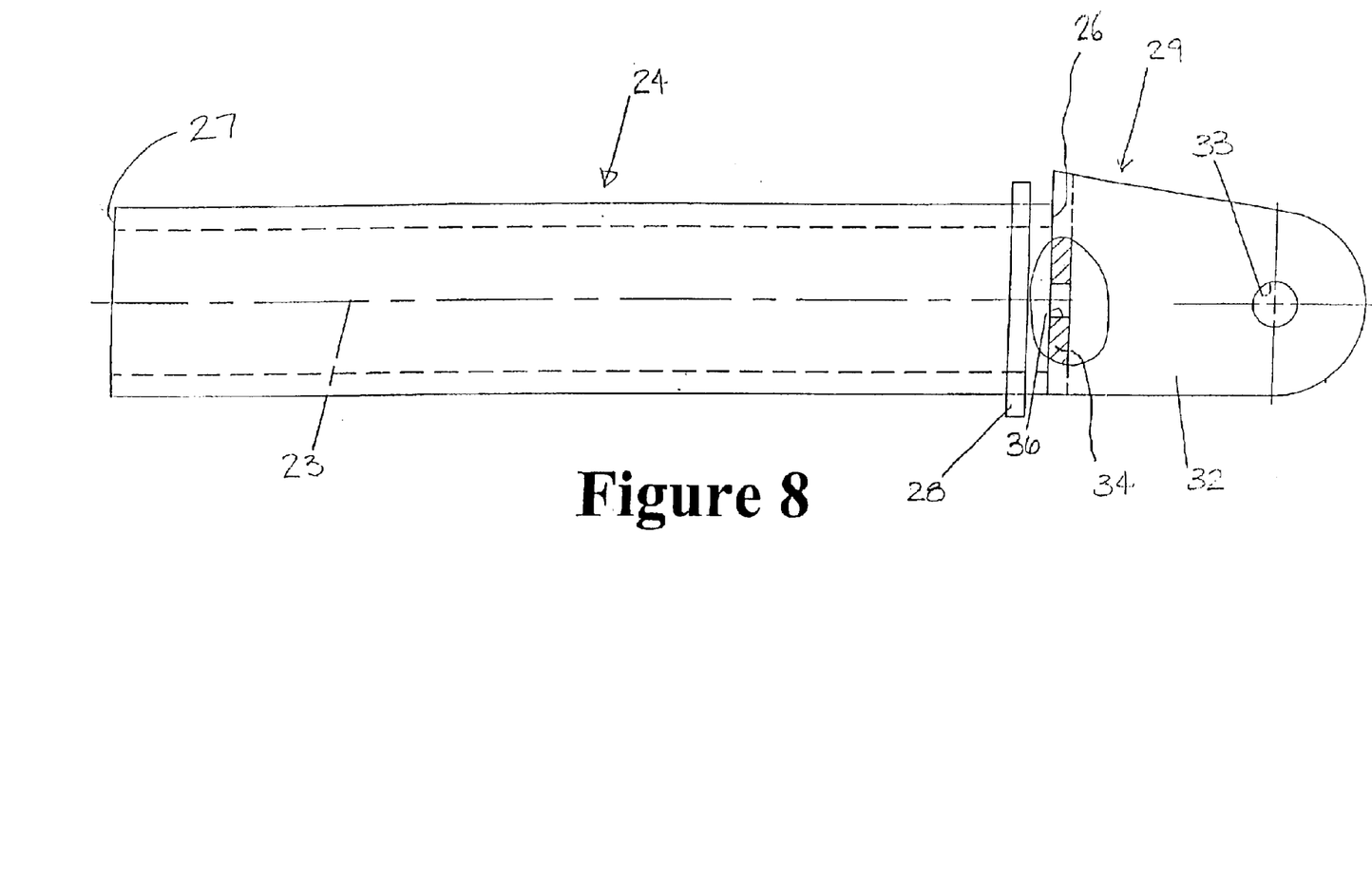
FIG. 8 is an enlarged, partially broken side view of the outer telescoping member tubular component of the FIG. 3A vehicle suspension device.

The spring carrier 13 includes (FIG. 5) an elongate, generally cup shaped, cylindrical tubular inner slider 24 having an outboard end 26 and an open inboard end 27. An enlarged diameter circumferential rib 28 fixedly surrounds the tubular slider 24 adjacent its outboard end 26. A U-shaped clevis 29 extends generally outboard from the tubular slider outboard end 26. The clevis 29 comprises a pair of laterally spaced plate-like arms 32 and a bight wall 34 from which the arms 32 fixedly extend in an outboard direction. The bight wall 34 is fixed, as by welding, to and closes the outboard end 26 of the tubular slider 24. The upper edge portion 35 of the bight wall extends radially above the tubular slider 24. Axially aligned bores 33 extend respectively through the arms 32. A bore 36 (FIG. 8) extends through the bight wall 34 on the axis 23 and hence coaxially of the tubular slider 24.

The slider 24 is sized to snugly slidably fit in the sleeve 37 as in FIG. 5. The inside diameter of the sleeve 37 is greater by a minimal clearance amount, preferably about 5/1000 inch, than an outside diameter of the tubular slider 24. The sleeve 37 and slider 24 are intended to substantially telescopically overlap, i.e. to a substantial minimum extent, as in FIGS. 2C, 3A, 3B and 5, at least about ⅔ of the effective interior length of the sleeve 37. The diameter and wall thickness of the sleeve 37 and slider 24, the substantial minimum overlap of the slider 24 and sleeve 37 with the device D in its fully extended condition, and the minimal radial clearance between the sleeve 37 and slider 24, together prevent bending loads that may occur in use from bending or otherwise deforming the device D, thus aiding continued proper operation of the suspension system 10.

Figure 5A:
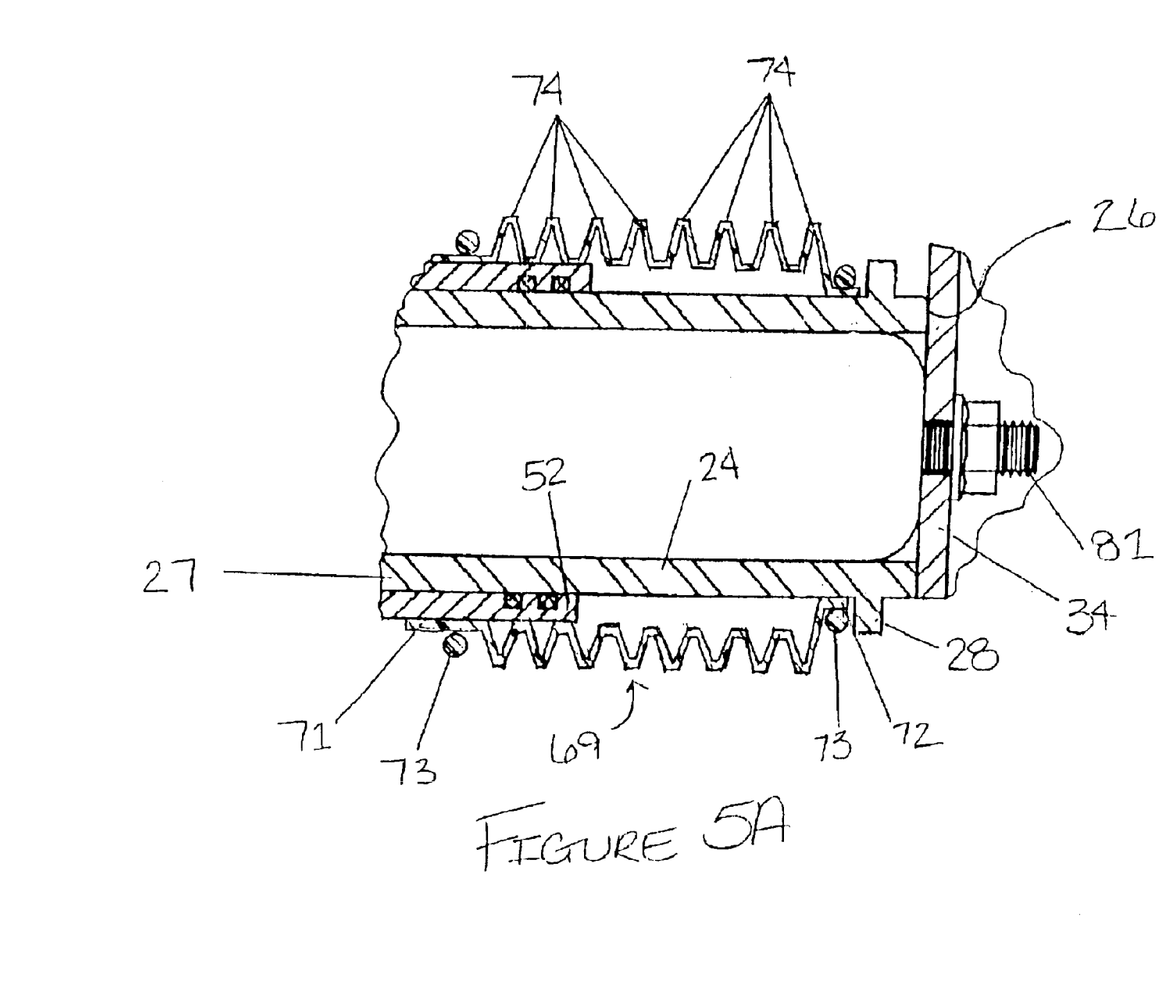
FIG. 5A is an enlarged fragment of FIG. 5 with a boot added.

As illustrated in FIGS. 4 and 5A, a telescoping boot 69 preferably surrounds the inboard end portion of the sleeve 37 and the portion of the slider 24 slidable into the latter, to prevent entry of outside foreign matter (e.g. dust, mud, water, etc.) into the overlap between the telescoped sleeve 37 and slider 24. The boot 69 thus has a first end 71 sized to snugly slidably extend over the inboard end 51 of the sleeve 37, and a second end 72 sized to snugly slidably fit over the inboard end 27 and major length of the slider 24. The ends 71 and 72 (FIG. 5A) of the boot 69 are respectively fixedly clamped to the inboard end portion of the sleeve 37 and to the slider 24 at the inboard face of the annular rib 28 in any suitable manner, such as by conventional, tightly surrounding, removable ties 73. At least the central and major length of the boot 69 is of elastomeric material and comprises a number of circumferential, axially alternating ridges and valleys 74 defining a bellows which axially collapses and expands as the device D contracts and extends. The boot 69 is intended to extend the operating life of the telescoping device D by preventing dirt and other debris from interfering with its operation.

The device D (FIGS. 4 and 5) further includes an elongate damper 76 positioned coaxially within the telescoping housing 22. The damper 76 may be any conventional double acting damper capable of operation in a substantially horizontal position (unlike conventional shock absorbers). In one unit embodying the invention, the damper 76 was a steering stabilizer, Napa part #SC2940, manufactured by Tenneco Automotive Co. of Cozad, Nebr.

The damper 76 (FIG. 5) comprises a piston containing cylinder 77. A threaded stud 81 projects from the cylinder outboard end 78 and carries a nut 93. A coaxial piston rod 82 has an inboard portion that axially movably extends at 83 from the inboard end of the cylinder 77 (toward the left in FIG. 5). The piston rod 82 also has a reduced diameter end portion 84, the remote part 86 of which is threaded. A circumferentially extending, axially facing shoulder 87 radially connects piston rod portions 83 and 84. A cup washer 88 has its tubular axial flange welded or otherwise fixed on the piston rod inboard portion 83 at the shoulder 87. A washer 89 is slidable on the piston rod reduced diameter portion 84 and abuts the shoulder 87. A resilient annular bushing 49 fits snugly on the reduced diameter portion 84 of the piston rod 82 and is removably retained thereon by a washer 91 retained by a nut 92 on the threaded portion 86. The bushing 49 is preferably of resilient material e.g. rubber or polyurethane, to damp vibration of other suspension device D components, as discussed below.

Assembly

To assemble the suspension device D, the piston rod 82 (minus the resilient bushing 49, washer 91 and nut 92) is inserted (leftward in FIG. 5) into the open end 51 of the sleeve 37, so that the piston rod reduced diameter portion 84 extends through the bushing 48 and end wall bore 47, to project from the sleeve outboard end 42 along the axis 23.

The resilient bushing 49 is slid onto the piston rod reduced diameter portion 84 followed by the washer 91. The nut 92 is threaded onto the piston rod threaded portion 86 and tightened, to clamp the sleeve end wall 43 snugly between the bushings 48 and 49 and thus fix the piston rod 82 within the sleeve 37.

The open end 27 of the tubular slider 24 is slid, preferably snugly, over the outboard end 26 of the piston cylinder 77 and inserted snugly into the open inboard end 51 of the sleeve 37, until the outboard end 78 of the piston cylinder 77 abuts the bight wall 34 closing the outboard end 26 of the tubular slider 24 and the threaded stud 81 extends through the bore 36 therein. The nut 93 is threaded on the threaded stud 81 and tightened to clamp bight wall 34 between the piston cylinder 27 and nut 93 and thereby fix the piston cylinder 77 in the slider member 24.

To install the thus assembled suspension device D on the vehicle V here shown, the bracket 59 is placed saddle-like, so the side plates 61 snugly straddle, and the cross plate 62 abuts, the support component (e.g. frame) 11 of the vehicle, and the bores 67 and 68 are aligned with bores (not shown) extending through the support component 11. Bolts 94 (FIGS. 2A–2C) are inserted through the bracket bores 67 and 68 and respective aligned support component 11 bores and fixed there by tightened nuts (not shown), to securely fix the suspension device D to the support component 11. The relatively wide spacing of the bolt bores 67 and 68 and the elongate length of the abutting cross plate 62 positively prevent the device D from rocking, or pivoting, on the support component 11, in use. If desired, the bolts 94 may be substituted by other fasteners or by welding the bracket 59 to the vehicle support component 11.

With the leaf spring left end 17 pivotally fixed to the bracket 18 by a bolt 96 (FIGS. 2A–2C) and nut (not shown), the conventionally curled orifice forming, free right end 16 of the leaf spring 14 is then pivotally fixed between the arms 32 of the clevis 29, by a bolt 97 (FIGS. 2A–2C) extending through the bores 33 in the arms 32 and aligned spring curled end orifice and fixed by a nut (not shown). The spring free end 16 is thus free to pivot with respect to the clevis 29 about the axis of the bolt 97. It is preferable that the suspension device be positioned so its extension/contraction axis 23 is parallel with the adjacent lower surface of the vehicle support component 11 and thus at an acute angle to the adjacent part of the spring 24 as shown. However, the bracket 59 can be substituted by other mounting structure suitable for proper orientation of the device D with respect to the spring and suspension component

Operation

With the vehicle at rest on a level parking lot or the respective vehicle wheel rolling on even terrain, e.g. a smooth road, the leaf spring 14 is in its intermediate, rest condition of FIG. 2B. In this condition, the slider 24 is about mid-way in its path in the sleeve 37 and the piston rod 82 is at rest and in the cylinder 77.

Referring now to FIG. 2A, with the respective vehicle wheel rolling through a dip, the axle 21 drops with the wheel and reduces its upward force on the midportion of the leaf spring 14, thus unloading the leaf spring 14 and allowing it to relax into a more bowed shape, such that the spring free end 16 moves closer to the spring end 17 pivoted on the fixed bracket 18. The moving leaf spring free end 16 cannot bend the suspension device D and thus can move only along the latter's axis 23, so as to force the slider 24 (FIG. 5) to move further into the sleeve 37. This moves the push rod 82 further into the interior of the cylinder 77. That movement is damped by the damper 76 and, through damping of the motion of the slider 24, the bowing motion of the leaf spring 14 toward its FIG. 2A bowed shape is damped.

The slider 24 and sleeve 37 are of sufficient lengths that the slider inboard end 27 does not quite reach bushing 48 in the sleeve 37 when the leaf spring 14 is fully bowed. This is unlike the conventional shock absorber 110 (FIG. 1A), which cannot be of sufficient length to allow the leaf spring 114 to fully bow.

Referring now to FIG. 2C, when the respective vehicle wheel is rolling over a bump, the resulting upward movement of the axle 21 forces the midportion of the leaf spring 14 upward, straightening the leaf spring 14, and so moving its ends 16 and 17 apart. The leaf spring end 17 is pivotally fixed by its bracket 18 and so spring end 16 must move. Such movement is constrained by the device 10 to be only along the axis 23 (FIG. 5) and in turn pulls the slider 24 further out of the sleeve 37 toward the extended portion of FIG. 5. This in turn pulls the rod 82 further out of the cylinder 77 toward the FIG. 5 position. Such movement is damped by the damper 76, and through damping of the slider 24 in turn damps the straightening of the leaf spring 14 toward its extended position.

It will be understood that, after damping the described initial bowing motion to the FIG. 2A bowed shaped, and straightening motion to the FIG. 2C straightened shape, of the spring 14, the damper 76 damps subsequent oscillatory motion of the spring.

The bushing 48 is clamped against the sleeve wall inner facing surface 44 by the flange 88 and the washer 89, which is in turn prevented from movement along the piston rod 84 by the shoulder 87. Thus, the bushing 48 remains fixed against the sleeve wall 43 as the piston rod 84 is pulled out of the cylinder 77. As illustrated, a clearance exists between the bushing 48 and the piston rod 82. This is preferable to reduce wear on the piston rod 82 and the bushing 48. The clearance also prevents the transfer of any vibrations of the piston rod 82 to the bushing 48 and therefore the sleeve 37. Likewise, a clearance exists between the bore 47 and the piston rod 82 to reduce wear and vibration transfer between the piston rod 82 and the sleeve 37.

The breather vent 56 (FIG. 3B) keeps the interior of the sleeve 37 at atmospheric pressure as the tubular slider 24 advances and retracts in the sleeve 37. The vent's bore 54 is positioned close to the sleeve outboard end 51 such that the vent 56 is not blocked by the tubular slider 24 even when the latter abuts the bushing 48. There is sufficient radial clearance between the bushing and the inner face of the sleeve 37 for air flow between the vent 56 and the interior of the sleeve 37 inboard of the bushing 48.

The grease fitting 58 is located to allow lubricating grease to be injected radially between the sleeve wall 38 and the slider member 24 inboard of the seal rings 53. To minimize wear, the grease fitting's bore 57 is sufficiently close to the sleeve open inboard end 51 that it radially opposes tubular slider 24 through the lattet's normal axial operating range of movement in the sleeve 37.

It should be appreciated that the foregoing description is for the purposes of illustration only, and further alternative embodiments of this invention are possible without departing from the scope of the claims.

Thus, although particular preferred embodiments of the present invention have been disclosed in detail for illustrative purposes, it will be recognized that variations or modifications lie within the scope of the present invention and do not depart from the spirit of the invention.

What is claimed is:

1. For a vehicle having a body and a suspension system, the suspension system comprising:
   a ground engaging member;
   an axle supported on said ground engaging member;
   fixed first and second suspension attachment points on a vehicle body;
   an elongate spring unit of which at least a part is resiliently bendable, said unit having first and second end portions and an intermediate portion, said intermediate portion being supported on said axle, said first end portion being pivotally fixed to and supporting said first attachment point;
   a telescoping device having a reciprocable tubular slider having a free end portion pivotally fixed to and supported by said second end portion of said elongate spring unit, and a fixed tubular sleeve coaxially reciprocably guiding the inboard end portion of said reciprocating tubular slider and fixed to and supporting said second attachment point, said tubular slider free end portion being cantilevered from said fixed tubular sleeve, said second spring unit end portion connecting to and supporting the weight of said second attachment point through said cantilevered reciprocable tubular slider and fixed tubular sleeve.

2. The apparatus of claim 1, including a self-contained damper which includes a cylinder fixed in said reciprocating tubular slider and an extensible rod fixed in said fixed tubular sleeve for damping telescoping movement of said shackle substitute device, wherein said shackle substitute device is adapted both to mount a vehicle body on said elongate bendable spring unit and damp flexing of said spring unit.

3. The apparatus of claim 1, wherein said reciprocable tubular slider and fixed tubular sleeve are coaxially aligned along a reciprocating axis, said tubular slider having positions along said reciprocating axis and cantilevered from said tubular sleeve, first and second lateral positions of said second spring unit end portion being spaced on said reciprocating axis, the reciprocating axis of said tubular sleeve and slider extending in a direction angled to the vertical, such that vehicle weight imposes transverse bending stresses on said telescoping device, said reciprocating tubular slider being disposed in radially snug, longitudinally overlapping relation in said fixed tubular sleeve so as to maintain said sleeve and slider coaxially aligned on said reciprocating axis despite applied transverse bending stresses, said tubular slider being linearly reciprocable in said tubular sleeve on said reciprocating axis.

4. The apparatus of claim 1 wherein said elongate resiliently bendable spring is a leaf spring and said leaf spring has relatively bowed and straightened alternative shapes corresponding to contracted and extended length positions of said telescoping device respectively, said second end portion of said leaf spring having a path of motion coaxial with the reciprocating axis of said reciprocable slider and corresponding to a range of leaf spring shapes between said relatively bowed and straightened shapes.

5. The apparatus of claim 1 including a bracket fixed to said second attachment point and to said tubular sleeve, and a clevis fixed to the free end of said tubular slider and coaxially pivoted on said second end portion of said spring unit.

6. The apparatus of claim 1 wherein said ground engaging member comprises a wheel, said vehicle including at least two axles and plural wheels rotatable on said axles, said spring unit comprises a leaf spring and said telescoping device houses a damping member, said leaf spring and damping member being associated with a first said wheel.

7. A shackle substitute for use on a vehicle having (1) a suspended portion including a body and (2) an elongate resiliently bendable spring member resiliently supporting said body and having one end portion supporting and pivoted with respect to the vehicle body, such suspension device comprising:
   a telescoping outer housing including an outer sleeve and an inner tubular slider axially movably telescoped in said outer sleeve, first and second mounting parts fixed respectively on said outer sleeve and slider, one of said mounting parts having a fixed securement portion adapted to fixedly engage and support a vehicle suspended portion and the other of said mounting parts having a pivotable securement portion adapted to pivotally engage and be supported by an elongate bendable spring member second end portion; and
   a self contained damper in said telescoping outer housing and including a cylinder fixed in one of said outer sleeve and inner tubular slider, and further including an elongate rod extending in an extensible/contractible manner from said cylinder and having a free end portion fixed with respect to the other of said outer sleeve and inner tubular slider, such that telescoping of said outer housing allows changes in length of the elongate bendable spring member.

8. The apparatus of claim 7 wherein said outer sleeve houses said damper rod and includes an air vent through a peripheral wall thereof adjacent said damper rod free end portion to allow air flow between the interior and exterior of said outer sleeve.

9. The apparatus of claim 7 wherein said other mounting part is on said inner tubular slider and includes a pivot bolt receiving hole.

10. The apparatus of claim 9 wherein said one mounting part is on said outer sleeve and includes a U-shaped bracket.

11. The apparatus of claim 9 wherein said damper cylinder is housed in and fixed with respect to said inner tubular slider and said damper rod is fixed with respect to said outer sleeve, said outer sleeve having an end wall including a bore through which said damper rod extends with a contact free clearance, and a resilient bushing interposed between said outer sleeve end wall and said damper rod.

12. For a vehicle having a body, axle, and first and second suspension attachment points fixed with respect to said body, a shackle substitute device adapted for fixed connection to the first suspension attachment point and for pivoting connection to the shackle-engageable-end of a leaf spring, the leaf spring having a further end pivoted on an axis fixed at the second suspension attachment point, and an axle-supporting intermediate portion, the shackle substitute device comprising:
   a bend resistant telescoping housing adapted for supporting a vehicle body on a leaf spring further end, said housing having an elongate outer sleeve having an open end and a closed end;
   a bracket for supporting a vehicle body and having an upward, second-attachment-point fixable portion and an inboard portion fixed to and carried by said outer sleeve;

an elongate tubular inner slider for supporting said outer sleeve, said slider having an inboard portion coaxially extending through said open end of and slidably telescoped in said outer sleeve, said slider having an outboard portion cantilevered from said outer sleeve, said tubular inner slider inboard portion having an open end open to the interior of said outer sleeve, said slider outboard portion having a closed end;

a leaf-spring-further-end pivot axis on said tubular slider closed end for pivotal support by the further end of a leaf spring;

said outer sleeve having a transverse load receiving portion at a first circumferential location thereon, said tubular inner slider having a transverse load receiving portion adjacent said outboard end portion thereof, said transverse load receiving portions of said outer sleeve and inner slider being axially spaced apart lengthwise of said spring substitute device and being circumferentially spaced on opposite sides of said spring substitute device, said bracket and leaf-spring-further-end pivot axis defining and being respectively located at said outer sleeve transverse load receiving portion and inner slider transverse load receiving portion, so that the weight of a vehicle applies a bending stress to said outer sleeve and inner slider portions between said bracket and said leaf-spring-further-end pivot axis and thereby to the portion of said inner slider cantilevered from said outer sleeve, said sleeve and tubular slider being rigid and having sufficient wall thickness and minimum overlap to resist bending by imposed transverse loading, said outer sleeve and inner slider being aligned on a common reciprocating axis defining alternative leaf-spring-further-end pivot locations respectively corresponding to bowed and straightened leaf spring conditions.

13. The apparatus of claim 12 including a self contained damper which includes a cylinder fixed in said slider and an extensible rod fixed in said sleeve for damping telescoping movement of said shackle substitute device, wherein said shackle substitute device is adapted to both mount a vehicle body on a spring and damp flexing of such a spring.

14. The apparatus of claim 13 in which said slider has a tubular length portion and the free end of said slider includes a transverse end wall, transversely spaced clevis arms extending axially outboard from said end wall and carrying said leaf-spring-further-end pivot axis extending transversely therebetween, said outer sleeve having an end wall defining said closed end thereof, said damper cylinder having a free end fixed to said outer sleeve end wall, said damper extensible rod extending loosely through a central opening in said outer sleeve end wall and being fixed thereto in radial clearance, axially cushioned relation.

15. The apparatus of claim 13 in which said outer sleeve and inner slider have a minimum overlap of about two-thirds the length of said outer sleeve, to resist bending of said shackle substitute device by bending stress applied thereto by axially spacing therealong of the transversely oppositely directed vehicle weight and supporting spring forces.

16. The apparatus of claim 15 including an air vent in the peripheral wall of said outer sleeve adjacent the enclosed end thereof and a grease fitting in said sleeve peripheral wall on the part of said sleeve continuously overlapping said slider.

* * * * *